US009294817B2

(12) United States Patent
Knudson et al.

(10) Patent No.: US 9,294,817 B2
(45) Date of Patent: Mar. 22, 2016

(54) PROGRAM GUIDE SYSTEM WITH COMBINATION CATEGORY SEARCH

(71) Applicant: Rovi Guides, Inc., Santa Clara, CA (US)

(72) Inventors: Edward B. Knudson, Lakewood, CO (US); Joel G. Hassell, Arvada, CO (US); Michael D. Ellis, Boulder, CO (US); William L. Thomas, Evergreen, CO (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

(21) Appl. No.: 14/727,009

(22) Filed: Jun. 1, 2015

(65) Prior Publication Data

US 2015/0264435 A1   Sep. 17, 2015

Related U.S. Application Data

(63) Continuation of application No. 14/527,418, filed on Oct. 29, 2014, now Pat. No. 9,084,016, which is a continuation of application No. 14/022,635, filed on Sep. 10, 2013, now Pat. No. 8,904,439, which is a (Continued)

(51) Int. Cl.
*G06F 13/00* (2006.01)
*G06F 3/00* (2006.01)
*H04N 5/445* (2011.01)
(Continued)

(52) U.S. Cl.
CPC .......... *H04N 21/4532* (2013.01); *G06F 3/0482* (2013.01); *H04N 5/44543* (2013.01); *H04N 21/4667* (2013.01); *H04N 21/4755* (2013.01); *H04N 21/482* (2013.01); *H04N 21/4821* (2013.01); *H04N 21/4828* (2013.01); *H04N 2005/44556* (2013.01)

(58) Field of Classification Search
CPC ............ H04N 21/4532; H04N 21/482; H04N 21/4821
See application file for complete search history.

(56) References Cited

U.S. PATENT DOCUMENTS 4,271,532 A   6/1981  Wine
4,367,559 A   1/1983  Tults
(Continued)

FOREIGN PATENT DOCUMENTS

DE   2338380 A1   2/1975
DE   3337204      4/1985
(Continued)

OTHER PUBLICATIONS

A New Approach to Addressability, Cable Data product brochure, undated.

(Continued)

*Primary Examiner* — Hunter B Lonsberry
(74) *Attorney, Agent, or Firm* — Ropes & Gray LLP

(57) ABSTRACT

An interactive television program guide system is provided in which the program guide may provide the user with a selectable list of combination categories. Combination categories are composed of multiple simple categories such as sports, news, comedy, movies, children, etc. Program listings are supplied to the program guide. At least some of the program listings are associated with combination categories. A combination category build process may be used to assign combination categories to program listings. The user is able to use the selectable categories list to quickly identify programming of interest.

20 Claims, 13 Drawing Sheets

Related U.S. Application Data continuation of application No. 13/761,477, filed on Feb. 7, 2013, now Pat. No. 8,572,654, which is a continuation of application No. 13/083,774, filed on Apr. 11, 2011, now Pat. No. 8,381,248, which is a continuation of application No. 12/826,910, filed on Jun. 30, 2010, now Pat. No. 7,945,929, which is a continuation of application No. 12/551,363, filed on Aug. 31, 2009, now Pat. No. 7,873,973, which is a continuation of application No. 11/254,554, filed on Oct. 19, 2005, now Pat. No. 7,603,685, which is a continuation of application No. 09/410,332, filed on Oct. 1, 1999, now abandoned.

(60) Provisional application No. 60/106,855, filed on Nov. 3, 1998.

(51) Int. Cl.
*H04N 21/45* (2011.01)
*G06F 3/0482* (2013.01)
*H04N 21/482* (2011.01)
*H04N 21/466* (2011.01)
*H04N 21/475* (2011.01)

(56) References Cited

U.S. PATENT DOCUMENTS

| | | |
|---|---|---|
| 5,075,771 A | 12/1991 | Hashimoto |
| 5,317,403 A | 5/1994 | Keenan |
| 5,353,121 A | 10/1994 | Young et al. |
| 5,432,561 A | 7/1995 | Strubbe |
| 5,477,262 A | 12/1995 | Banker et al. |
| 5,483,278 A | 1/1996 | Strubbe et al. |
| 5,532,754 A | 7/1996 | Young et al. |
| 5,534,911 A | 7/1996 | Levitan |
| 5,583,560 A | 12/1996 | Florin et al. |
| 5,585,866 A | 12/1996 | Miller et al. |
| 5,600,364 A | 2/1997 | Hendricks et al. |
| 5,617,565 A | 4/1997 | Augenbraun et al. |
| 5,621,456 A | 4/1997 | Florin et al. |
| 5,694,176 A | 12/1997 | Bruette et al. |
| 5,731,844 A | 3/1998 | Rauch et al. |
| 5,752,160 A | 5/1998 | Dunn |
| 5,774,357 A | 6/1998 | Hoffberg et al. |
| 5,798,785 A | 8/1998 | Hendricks et al. |
| 5,801,747 A | 9/1998 | Bedard |
| 5,822,123 A | 10/1998 | Davis et al. |
| 5,848,396 A | 12/1998 | Gerace |
| 5,867,226 A | 2/1999 | Wehmeyer et al. |
| 5,875,108 A | 2/1999 | Hoffberg et al. |
| 5,903,545 A | 5/1999 | Sabourin et al. |
| 5,973,683 A | 10/1999 | Cragun et al. |
| 5,977,964 A | 11/1999 | Williams et al. |
| 5,987,448 A | 11/1999 | Evans et al. |
| 6,005,597 A | 12/1999 | Barrett et al. |
| 6,008,803 A | 12/1999 | Rowe et al. |
| 6,029,195 A | 2/2000 | Herz |
| 6,075,526 A | 6/2000 | Rothmuller |
| 6,081,750 A | 6/2000 | Hoffberg et al. |
| 6,088,722 A | 7/2000 | Herz et al. |
| 6,133,909 A | 10/2000 | Schein et al. |
| 6,163,316 A | 12/2000 | Killian |
| 6,172,674 B1 | 1/2001 | Etheredge |
| 6,177,931 B1 | 1/2001 | Alexander et al. |
| 6,181,335 B1 | 1/2001 | Hendricks et al. |
| 6,208,384 B1 | 3/2001 | Schultheiss |
| 6,216,264 B1 | 4/2001 | Maze et al. |
| 6,253,188 B1 | 6/2001 | Witek et al. |
| 6,437,836 B1 | 8/2002 | Huang et al. |
| 6,505,348 B1 | 1/2003 | Knowles et al. |
| 6,865,746 B1 | 3/2005 | Herrington et al. |
| 2003/0110499 A1 | 6/2003 | Knudson et al. |
| 2005/0204388 A1 | 9/2005 | Knudson et al. |

FOREIGN PATENT DOCUMENTS

| | | |
|---|---|---|
| EP | 0721253 A2 | 7/1996 |
| EP | 0774866 A2 | 5/1997 |
| EP | 0854645 A2 | 7/1998 |
| GB | 1 554 411 | 10/1979 |
| GB | 2034995 A | 6/1980 |
| GB | 2126002 A | 3/1984 |
| GB | 2232031 A | 11/1990 |
| GB | 2264409 A | 8/1993 |
| JP | 59141878 A | 8/1984 |
| JP | 60-61935 A | 3/1994 |
| WO | WO-86/01359 A1 | 2/1986 |
| WO | WO-89/03085 | 4/1989 |
| WO | WO-90/07844 A1 | 7/1990 |
| WO | WO-91/05436 A1 | 4/1991 |
| WO | WO-94/13107 | 6/1994 |
| WO | WO-94/14284 A1 | 6/1994 |
| WO | WO-95/01056 | 1/1995 |
| WO | WO-95//28799 A1 | 10/1995 |
| WO | WO-95/32583 A1 | 11/1995 |
| WO | WO-95/32585 | 11/1995 |
| WO | WO-96/09721 A1 | 3/1996 |
| WO | WO-96/13935 A1 | 5/1996 |
| WO | WO-96/17473 A1 | 6/1996 |
| WO | WO-96/41478 | 12/1996 |
| WO | WO-97/43230 A1 | 11/1997 |
| WO | WO-98/26584 | 6/1998 |
| WO | WO-98/43183 A1 | 10/1998 |
| WO | WO-98/48566 A2 | 10/1998 |
| WO | WO-99/01984 A1 | 1/1999 |
| WO | WO-99/14947 A1 | 3/1999 |
| WO | WO-99/45701 A1 | 9/1999 |
| WO | WO-00/04708 A1 | 1/2000 |
| WO | WO-00/05889 A1 | 2/2000 |
| WO | WO-00/28734 | 5/2000 |

OTHER PUBLICATIONS

Addressable Converters: A New Development at Cable Data, Via Cable, Dec. 1981, pp. 1-11.

Bookmarks Management, Biomedical Libraries Web Group, May 15, 1997, http:--www.dartmouth.edu-~biomed-workshops-kcks-internet.htmld-bookmarks.html.

Brugliera, V. "Digital On-Screen Display: A New Technology for the Consumer Interface," Symposium Record, Cable Sessions, 18th International Television Symposium and Technical Exhibition, Montreux, Switzerland, Jun. 10-15, 1993, pp. 571-586.

Bryan Carne, "The Wired Household," IEEE Spectrum, Oct. 1979, pp. 61-66.

Eckhard Krüger, "Das Digitale Fernsehkennungssystem ZPS," Nachrichtentechnische Zeitschrift, Jun. 1982, pp. 368-376.

Edwardson and A. Gee, "CEEFAX: A Proposed New Broadcasting Service," Journal of the SMPTE, Jan. 1974, pp. 14-19.

Heller, "VPS a New System for Domestic VCR Start-Stop by Programme Labels Transmitted Within the Insertion Data Line," Symposium Record, Broadcast Sessions, 14th International TV Symposium, Montreux, Switzerland, Jun. 6-12, 1985, pp. 345-351.

Heller, "VPS—Ein Neues System Zur Beitragsgesteuerten Programmaufzeichnung," Rundfunktechnische Mitteilungen, Jul.-Aug. 1985, pp. 161-169.

Hofmann, Neumann, Oberlies, and Schadwinkel, "Videotext Programmiert Videorecorder," Rundfunktechnische Mitteilungen, Nov.-Dec. 1982, pp. 254-257.

James, "ORACLE—Broadcasting the Written Word," Wireless World, Jul. 1973, pp. 314-316.

Long, "The VCR Interface," 1986 NCTA Technical Papers, pp. 197-202.

McKenzie, "ORACLE—An Information Broadcasting Service Using Data Transmission in the Vertical Interval," Journal of the SMPTE, Jan. 1974, pp. 6-10.

Merrell, "Tac-Timer," 1986 NCTA Technical Papers, pp. 203-206.

Sommerhäuser, "Flexibel Programmieren Mit VPS," Funkschau 25, 1985, pp. 47-51.

PROGRAM GUIDE SYSTEM WITH COMBINATION CATEGORY SEARCH

This application is a continuation of U.S. patent application Ser. No. 14/527,418,filed Oct. 29, 2014 (allowed), which is a continuation of U.S. patent application Ser. No. 14/022,635, filed Sep. 10, 2013, now U.S. Pat. No. 8,904,439, which is a continuation of U.S. patent application Ser. No. 13/761,477, filed Feb. 7, 2013, now U.S. Pat. No. 8,572,654, which is a continuation of U.S. patent application Ser. No. 13/083,774, filed Apr. 11, 2011, now U.S. Pat. No. 8,381,248, which is a continuation of U.S. patent application Ser. No. 12/826,910, filed Jun. 30, 2010, now U.S. Pat. No. 7,945,929, which is a continuation of U.S. patent application Ser. No. 12/551,363, filed Aug. 31, 2009, now U.S. Pat. No. 7,873,973, which is a continuation of U.S. patent application Ser. No. 11/254,554, filed Oct. 19, 2005, now U.S. Pat. No. 7,603,685, which is a continuation of U.S. patent application Ser. No. 09/410,332, filed Oct. 1, 1999 (abandoned), which claims the benefit under 35 U.S.C. §119(e) of U.S. Provisional Application Ser. No. 60/106,855, filed Nov. 3, 1998 (expired), all of which are hereby incorporated by reference herein in their entireties.

BACKGROUND OF THE INVENTION

This invention relates to interactive television program guides, and more particularly, to television program guides that provide programming categories or themes that are combinations of individual categories, and in which users may select particular subsets of programming by category or theme.

Cable, satellites, and broadcast television systems provide users with a large number of television channels. Users have traditionally consulted printed television program schedules to determine the programs being broadcast at a particular time. More recently, interactive electronic television program guides have been developed that allow television program information to be displayed on a user's television.

Interactive program guides are typically implemented on set-top boxes. Such program guides allow users to view television program listings in different display formats. For example, a user may instruct the program guide to display a grid or table of program listings organized in a channel-ordered or a time-ordered list. Users may also search and sort program listings by category (e.g., movies, sports, etc.) or by title (i.e., alphabetically).

Because there are so many television channels available, particularly with cable and satellite television systems, television program guides have been developed that allow users to select favorite channels. During tuning, the program guide may allow the user to tune to favorite channels only, while skipping all other channels. Alternatively, a display screen containing program listings may be organized in a way that reflects which channels are favorites. For example, a table of program listings may contain only favorite channels and all other channels may foe suppressed from view. According to another approach, program listings for all channels are displayed. However, when the user scans through the table of program listings, the cursor control, which highlights a program and allows the user to make a selection, will advance among the favorite channels and skip over the other channels.

Another approach for assisting the user in selecting among the television channels available is to allow users to search for program listings in categories (sometimes referred to as genres or themes). With this approach the user cannot narrow the search beyond that of the standard categories (e.g., sports, comedies, etc.).

Other program guides allow the user to perform searches based on multiple categories, but this requires that the user select each category and then initiate the search, which may be a cumbersome process.

Some program guides address this abundance of information by having hierarchical categories. First, the user is presented with a relatively short list of higher-level or more general categories. Typical higher-level categories include movies, sports, or series programs. After the user selects a higher-level category, the program guide displays a list of subcategories, such as comedy, action, or baseball, from which the user may select one or more subcategories. This process may continue through several levels of subcategorization. While the list of categories at each level may be relatively short and easier to view and comprehend, a drawback is that the user may not readily appreciate which high-level category will lead to a desired specific category at a lower level. The user may be required to enter multiple keystrokes to find the desired category.

After tediously setting up a multiple category search or navigating a complex hierarchical menu, the user may eventually locate a desired category only to discover that there are no program listings for that category. Moreover, the user must repeat this process whenever searching for program listings involving a new category.

What is needed is a more sophisticated way in which a program guide can handle programming categories.

It is therefore an object of the present invention to provide an interactive television program guide system in which more specific programming categories may be generated.

It is also an object of the invention to provide program listings that may be displayed and searched according to programming categories that are more reflective of a user's interests.

SUMMARY OF THE INVENTION

These and other objects of the invention are accomplished in accordance with the principles of the present invention by providing an interactive television program guide system in which an interactive television program guide is at least partially implemented on user equipment. The program guide may be partially implemented at a server located, for example, at a television distribution facility and partially implemented on user television equipment or on user personal computer equipment.

The program guide displays program listings for a user on the user equipment. Each program listing may be associated with a plurality of programming categories. For example, a program listing may be associated with three categories. The categories associated with the program listing are independent in that the user need only perform a single-level search on any of the three categories to retrieve the associated program listing. The categories may be simple categories or combination categories. Combination categories are composed of multiple simple categories. Examples of simple categories are movies, comedy, sports and series. Examples of combination categories are comedy-movies, comedy-series, and sports-baseball. Not all combinations of categories need to be supported. For example, the program guide may support the combination category horror-movies but not horror-series. The combination categories that are supported are preferably those that allow users to readily access desirable groups of program listings.

The program guide may display the categories that are available in a list from which a user may select a desired category. The list may include both simple categories and combination categories. The simple categories and the combination categories may be intermixed. When the user selects a given category from the list, the program guide displays all program listings for that category.

The categories in the list may be displayed in a predefined initial order. For example, the categories may be listed in alphabetical order. All categories of a particular type may be grouped together. For example, all movie categories may be grouped together or all sports categories may be grouped together.

The program guide may allow the user to modify the list of categories to make it easier to locate the user's favorite categories. For example, each time a category is accessed it may be moved to the top of the list. Categories may also be moved to the top of the list based on how often they are accessed. The program guide may allow the user to change the order of the categories in the list directly by specifying a category to move to the top or bottom of the list or by otherwise rearranging the order of the categories. The program guide may also allow the user to remove a category from the list. The program guide may provide the user with an opportunity to add removed categories back to the list at a later time.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
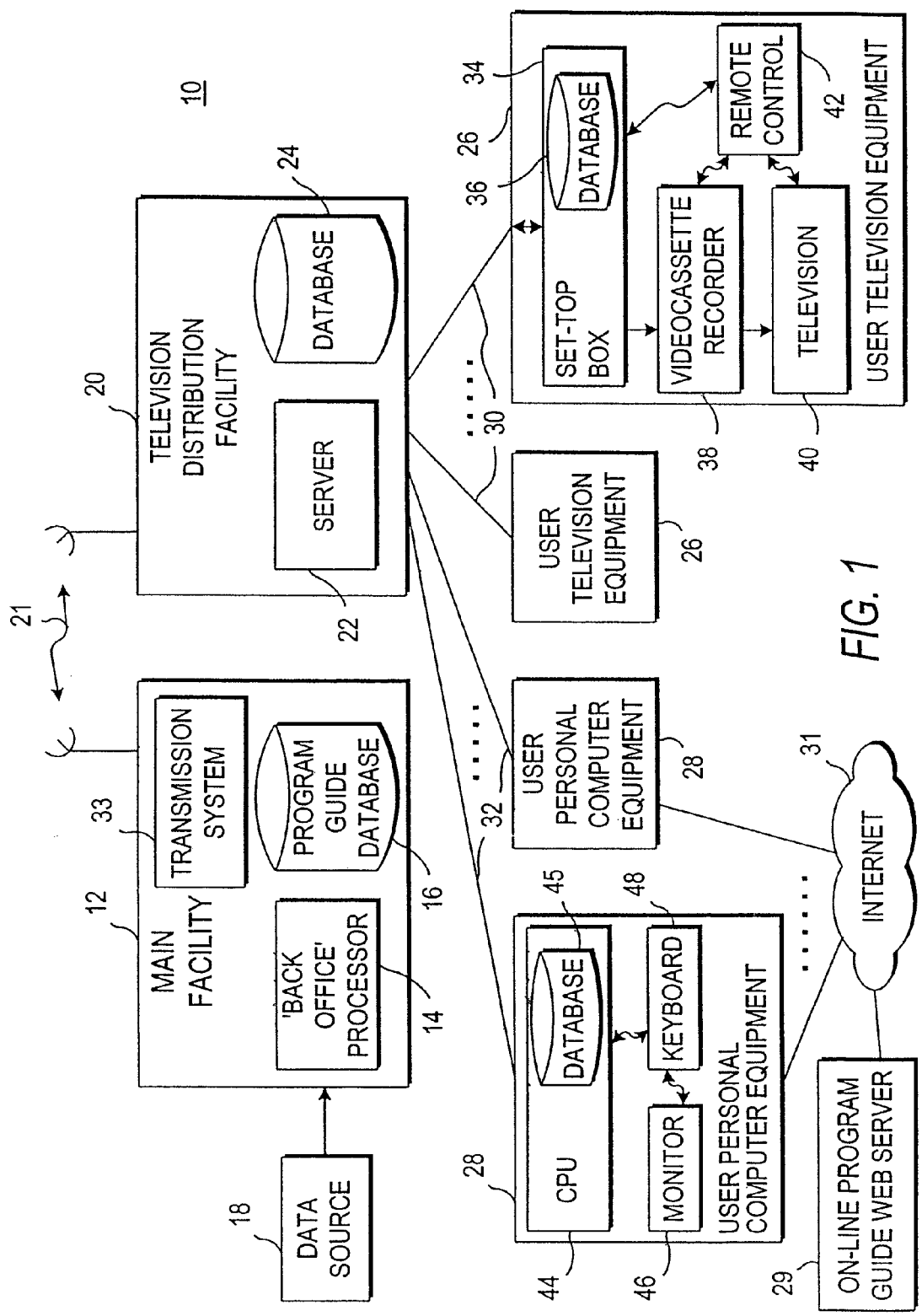
FIG. 1 is a diagram of an interactive television program guide system.

An illustrative interactive television program guide system 10 in accordance with the present invention is shown in FIG. 1. Main facility 12 may contain a back office processor 14 for organizing data, such as television program guide listings data, as will be described in greater detail below. Main facility 12 may also contain a program guide database 16 for storing program guide information, pay-per-view ordering information, television program promotional information, etc. Some of the information stored in database 16 may be from an external data source 18. Back office processor 14 is used to process the information stored in database 16.

Information from database 16 may be transmitted to multiple television distribution facilities such as television distribution facility 20 via communications links such as communications link 21. Only one television distribution facility is shown in FIG. 1 to avoid over-complicating the drawings. Each Link 21 may be a satellite link, a telephone network link, a cable or fiber optic link, a microwave link, a combination of such links, or any other suitable communications path. If it is desired to transmit video signals over link 21 in addition to data signals, a relatively high bandwidth link such as a satellite link is generally preferable to a relatively low bandwidth link such as a telephone line.

Television distribution facility 20 is a facility for distributing television signals to users. Television distribution facility 20 may be, for example, a cable system headend, a broadcast distribution facility, a satellite television distribution facility, or any other suitable distribution facility.

The program guide information transmitted by main facility 12 to television distribution facility 20 includes television program listings data for current and future television programs. The television program listings data for each program preferably includes numerous program characteristics, e.g., the title of the program, the channel for the program, a scheduled broadcast time (start time) and an ending time (or duration). Other typical program characteristics include ratings, critics' ratings, descriptions, categories (sports, movies, comedy, children, etc.), actors, etc. Transmitted program information may also include advertising information and pay program data such as pricing information for individual programs and subscription channels, time windows for ordering programs and channels, telephone numbers for placing orders that cannot be impulse ordered, etc.

Television distribution facility 20 distributes television programming and program guide information to the user television equipment 26 or the user personal computer (PC) equipment 28 of multiple users via communications paths 30 and 32, respectively. PC equipment 28 is based on a central processing unit (CPU) 44 and may have a monitor 46 and keyboard 48. User television equipment 26 may be based on a set-top box 34 and may have optional videocassette recorder 38, or any other suitable recording device, such as a digital storage device (e.g., recordable DVD or hard disk) or a server located at a central location, a television 40, and remote control 42.

Various techniques may be used to distribute television programming and program guide information. For example, television programming may be distributed over analog television channels and program guide data may be distributed over an out-of-band channel on paths 30. Data distribution may also involve using one or more digital channels on paths 30 and 32. Such digital channels may also be used for distributing television programming and other information. Multiple television and audio channels (analog, digital, or both analog and digital) may be provided to set-top boxes 34 and PC equipment 28 via communications paths 30 and 32. In user television equipment 26, television programs may be tuned to user's set-top box 34 and may be displayed by television 40. In user PC equipment 28, a video board or other such component may be used to tune to a television program, and the television program may be displayed on monitor 46. Program listings and other information may be distributed via communications paths 32 to PC equipment 28, which may have a cable modem or other such communications device for receiving or transmitting data. In addition, program listings and other data may be distributed by one or more distribution facilities that are similar to but separate from television distribution facility 20 using communications paths that are separate from communications paths 30 and 32. If desired, data from the main facility 12 may be distributed to PC equipment 28 over the Internet or other suitable communications path that does not involve the use of television distribution facility 20. In some configurations, program guide functions are provided in the form of an on-line program guide by using PC equipment 28 to access a web server such as web server 29 over the Internet 31 or other such data network.

The program guide system may use a client-server architecture whether or not the system involves use of the Internet. In a client-server arrangement, the program guide is partially implemented on a server and partially implemented on a client. The server may be a server such as server 22 located at, for example, television distribution facility 20. Processors in the user equipment, such as set top box 34 or CPU 44, may act as the client processors. Program guide data that are distributed to a client-server program guide at television distribution facility 20 may toe stored in a database 24 at television distribution facility 20 that is maintained by server 22. For clarity, the present invention is described primarily in the context of an interactive television program guide that is implemented on user equipment using a set-top box 34 or CPU 44 that receives data from television distribution facility 20, rather than in the context of program guides that are implemented using an on-line program guide configuration, are implemented partially on a server and partially on user equipment, or are implemented using any other such arrangements.

Certain functions such as pay program purchasing may require set-top boxes 34 to transmit data to television distribution facility 20 over communications paths 30. If desired, such data may be transmitted over telephone lines or other separate communications paths. If functions such as these are provided using facilities separate from television distribution facility 20, some of the communications involving set-top boxes 34 may be made directly with the separate facilities.

User television equipment 26 has a receiver, which is typically a set-top box such as set-top box 34, but which may be other suitable television equipment into which circuitry similar to set-top-box circuitry has been integrated. For example, user television equipment 26 may be based on an advanced television receiver such as a high definition television (HDTV) receiver. Program guide data may be distributed to set-top boxes 34 periodically or continuously and stored in database 36. In a client-server architecture, this entire database need not be maintained on the set-top box. For example, the program guide may maintain a database such as database 24 using a server such as server 22 located at television distribution facility 20 or at some other appropriate location or locations. Television distribution facility 20 may poll set-top boxes 34 periodically for certain information (e.g., pay program account information or information regarding programs that have been purchased and viewed using locally-generated authorization techniques).

Main facility 12 preferably contains a processor to handle information distribution tasks. Each set-top box 34 preferably contains a processor to handle tasks associated with implementing a program guide application on the set-top box 34. User PC equipment contains CPU 44 to handle tasks associated with implementing a program guide application. Television distribution facility 20 may contain a processor for tasks associated with monitoring a user's interactions with the interactive program guides implemented on user PC equipment 28 and user television equipment 26 and for handling tasks associated with the distribution of program guide data and other information to user PC equipment and user television equipment 26. Moreover, the processor of television distribution facility 20 may be used to support the server functions of a client-server program guide.

In user television equipment 26, videocassette recorders 38 allow selected television programs to be recorded. Each videocassette recorder 38 is connected to a respective television 40. To record a program, set-top box 34 tunes to a particular channel and sends control signals to videocassette recorder 38 (e.g., using an infrared transmitter) that direct videocassette recorder 38 to start and stop recording at the appropriate times.

During use of the interactive television program guide implemented on set-top box 34, television program listings and other information may be displayed on television 40. Such program guide displays may be presented as an overlay on top of a television program to which the user has tuned with set-top box 34 or may be presented in place of such a program. Each set-top box 34, videocassette recorder 38, and television 40 may be controlled by one or more remote controls 42 or any other suitable user input interface such as a wireless keyboard, mouse, trackball, dedicated set of buttons, etc. Remote controls such as remote control 42 have various buttons that may be pressed by the user such as arrow keys (for directing on-screen movement of a highlight region, scrolling functions, etc.), an OK, select, enter, or other such selection key for making a selection (hereinafter referred to as an enter key), channel number keys (for selecting a television channel), a favorites key (to invoke functions related to user preferences), a delete key (to delete menu items or to express a disinterest in certain user preferences), etc.

PC equipment, such as PC equipment 28 is based on a CPU 44 that maintains a database 45. A program guide implemented on PC equipment 28 may be used to access and display program guide information on monitor 46. User selections and inputs may be made by a keyboard 48, mouse, trackball, or other PC input devices. It is understood that the following discussion, although directed to user television equipment and set top boxes, is applicable to program guides used in connection with PC equipment.

Modern cable and satellite systems provide users with a wide range of programming, of which only a portion may be of interest to a user at a particular . time. In order to locate programs of interest, program listings data is associated with each program. The program guide displays program listings for the user in various display formats. The program guide may allow the user to search for program listings of interest using keywords. For example, each program listing may be associated with one or more programming categories that identify the subject matter of the program. Typical categories, which are also sometimes called themes or genres, include, e.g., sports, news, movies, comedy, children's, adult, etc. As will be described in greater detail below, program listings data may be provided to the main facility 12 from an external data source 18. In the program listings data provided by external data source 18, each program listing may already be associated with one or more categories. Back office processor 14 and transmission system 33 may also perform functions associated with assigning program listings to appropriate programming categories.

Program guides typically display lists of available programming categories, and allow users to search through the program listings data by selecting one or more such categories. In accordance with the present invention, users may search for program listings of interest using both "simple" categories and "combination" categories. A simple category is an individual programming category, such as sports, comedy, horror, news, movies, children, adult, etc. A combination category is a programming category that is composed of multiple simple categories, such as comedy-movies, comedy-series, sports-baseball, or sports-comedy. Where not specified, the term programming category refers collectively to both simple and combination categories.

In main facility 12, program listings may initially be categorized into simple categories. This may be accomplished, for example, by manual data entry. If desired, program listings data may be received from a data source 18 that already has been categorized in simple categories. An automatic process in back office processor 14 or transmission system 33 may process each program listing with associated simple categories to assign that program listing to appropriate combination categories from among the combination categories supported by the system.

Figure 2:
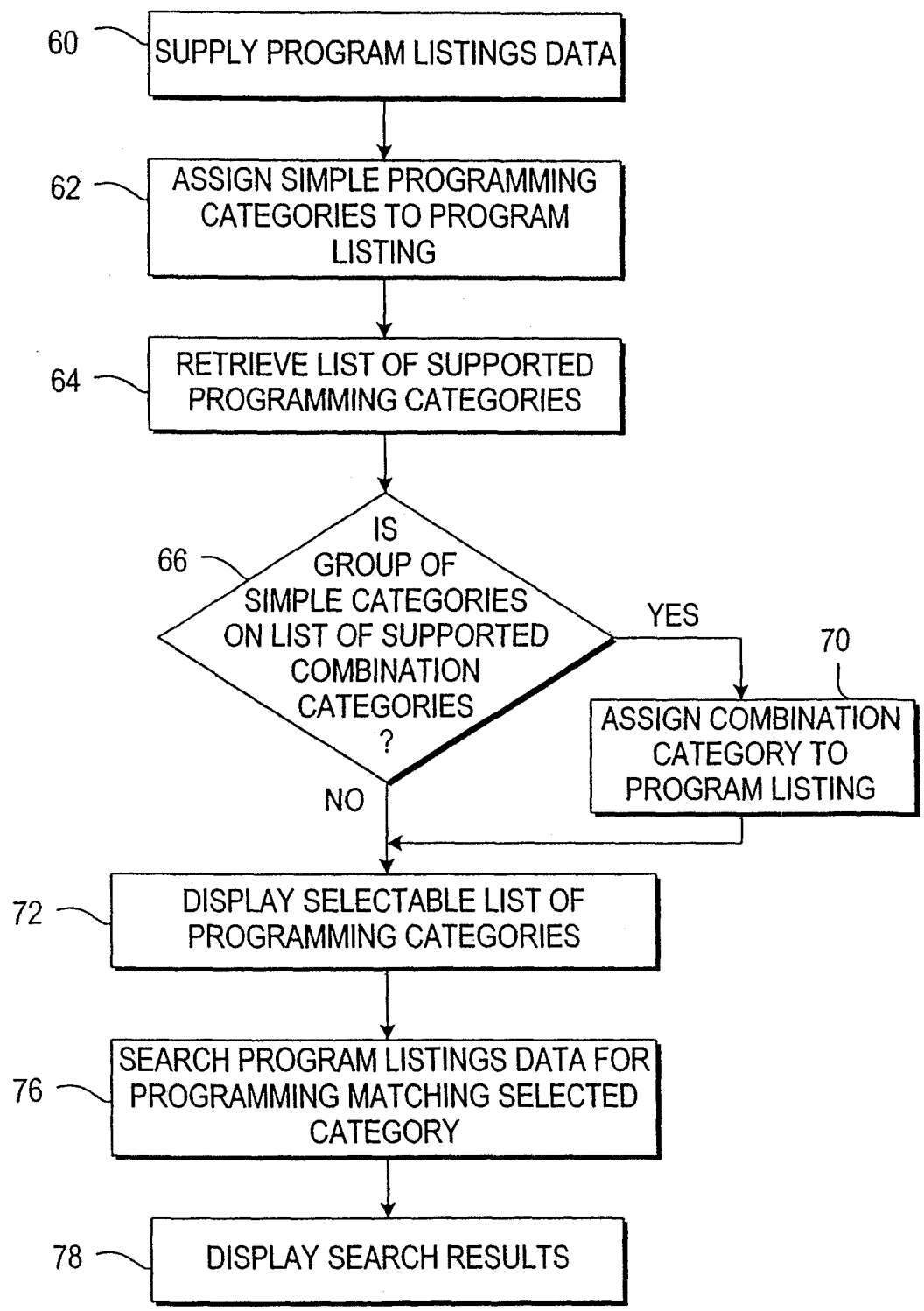
FIG. 2 is a flow chart of steps involved in assigning categories to program listings, allowing the user to select a given category, and display a corresponding set of matching program listings in accordance with the present invention.

This process is illustrated in greater detail in FIG. 2. As shown in step 60, program listings information is supplied to main facility 12 of FIG. 1 from one or more data sources, such as data source 18 of FIG. 1. The program listings information may be composed of programming titles, channels, scheduled broadcast times, program durations (or end times), ratings, critics ratings, descriptions, simple categories, actors, etc. At step 62, each program listing is reviewed and one or more simple categories are assigned to the program listing if necessary. This step may be performed by an operator after reviewing the program listing, a program synopsis or other information. This step may alternatively be automated by assigning categories based on key words appearing in the program description associated with the listing. If desired, simple categories may be assigned to the program listings prior to transmission of the program listings data from data source 18 (such that steps 60 and 62 would be combined).

At step 64, a list of preselected combination categories is retrieved from memory (e.g., memory located in back office processor 14). The list of simple and combination categories that are supported by the program guide are supplied by the main facility 12 to the user equipment 26/28, or the program guide server 22, or the web server 29, either with the program guide listings or separately, and stored in memory in advance of step 64. Information on which combination categories (and simple categories) are supported by the system is also provided to the program guides, so that the program guides may present appropriate category selection options to the users. As will be described below with respect to FIG. 2 (step 66) and FIG. 4, the list of supported categories may be used by the program guide to determine which categories to display to the user. The number of simple programming categories may be large due to the diversity of programming available. Therefore, the total number of potential combination categories, composed of every possible pair of simple categories, is even larger and may be unmanageable. Not every possible combination of two simple categories is logical or useful to the user. Therefore, only some of the possible combination categories are preferably supported by the program guide. The selection of supported combination categories by the program guide provider may be based on user interest in the various combinations. The list of supported combination categories may be derived from high user interest as expressed by a relatively high frequency of selection of the constituent simple categories, for example. Step 62 and step 64 are independent of one another. They may be performed concurrently or consecutively. It is also understood that step 64 need only be performed once and the list of supported categories may be accessed in later steps.

At step 66, the program listings data for each program, which includes at least the program title and one or more simple programming categories, is reviewed. The simple programming categories associated with a particular program listing are compared with the list of supported combination categories. When two or more simple categories associated with a given program listing are determined to match a supported combination category in the supported combination category list, that combination category is assigned to the given program listing at step 70. Steps 66 and 70 may be performed repeatedly, until each program listing has been reviewed and assigned any relevant combination categories. The above-described combination category build process of steps 60, 62, 64, 66, 68 and 70 may be executed automatically at back office processor 14, at the transmission system 33, or any other such suitable location.

Figure 3A:
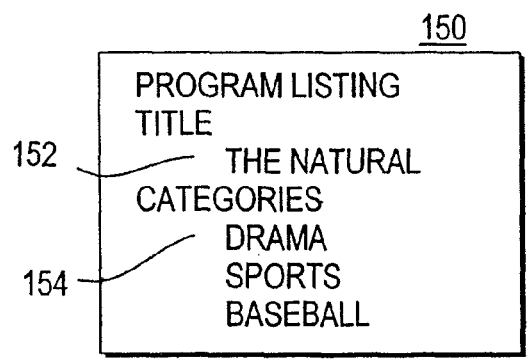
FIG. 3(a) is illustrative program listings data in accordance with the present invention.
Figure 3B:
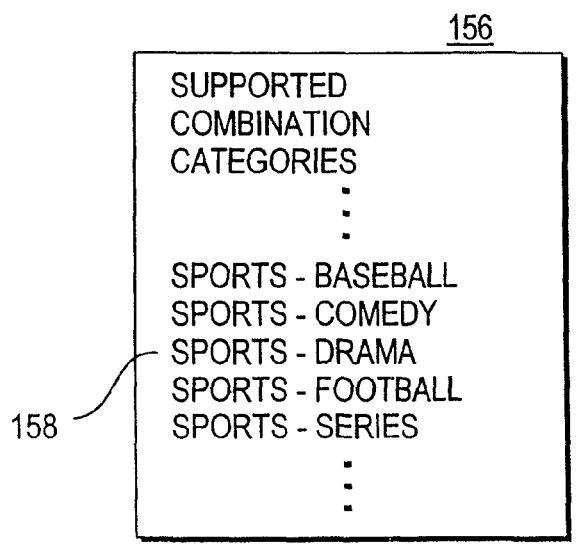
FIG. 3(b) is a partial listing of exemplary combination categories supported by the program guide in accordance with the present invention.
Figure 3C:
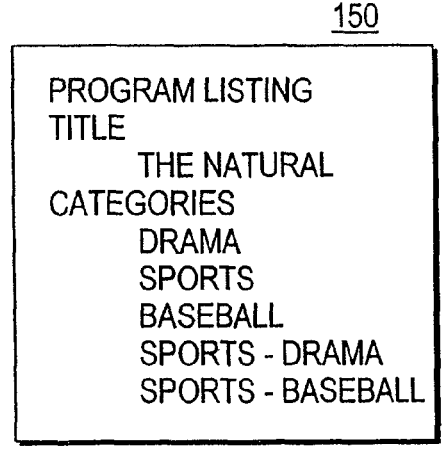
FIG. 3(c) is illustrative program listings data similar to that shown in FIG. 3(a), but modified following a combination category build process in accordance with the present invention.

Illustrative data structures of the type that may be used by the program guide system are shown in FIGS. 3(a)-3(c). An illustrative data structure 150 that contains title information 152 for the program The Natural is shown in FIG. 3(a). Several simple programming categories 154 have been assigned to this program listing, i.e., drama, sports, and baseball (e.g., at step 62 of FIG. 2). A portion of an illustrative list 156 of supported combination categories 158 is shown in FIG. 3(b). For example, sports-drama, sports-comedy, sports-series, sports-baseball, and sports-football are in the list. Continuing with this example, other conceivable combination categories, such as drama-baseball are not supported. In steps 66 and 70 of FIG. 2, the simple categories associated with the program listing of FIG. 3(a) are compared with the supported combination category list of FIG. 3(b) until the combination category build process is complete and revised program listings data such as the revised program listings data 160 illustrated in FIG. 3(c) has been produced. At step 66 of FIG. 2, the build process groups simple categories sports and drama, and determines that a combination category which includes sports and drama, i.e., sports-drama, is supported in list 156. Next, the program listing of FIG. 3(a) is assigned the combination category sports-drama at step 70. Steps 66 and 70 may be repeated as necessary until all possible groups of simple categories have been compared with the list 156 of supported combination categories. Thus, the build process notes the categories sports and baseball and assigns the combination category sports-baseball. It is understood that the process described above is exemplary only, and that other procedures for assigning combination categories to programs are contemplated. For example, all simple categories may be combined as combination categories first, and then unsupported combination categories subsequently deleted.

Figure 4:
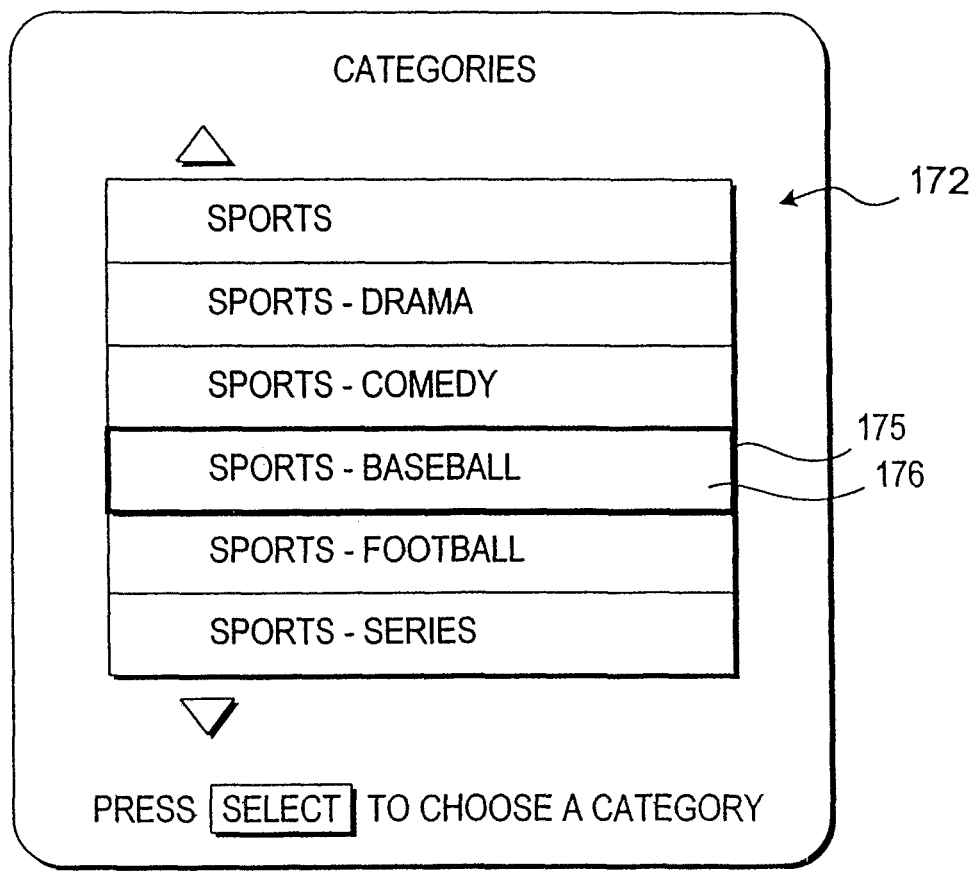
FIG. 4 is an illustrative interactive program guide display screen for displaying and selecting categories in accordance with the present invention.

With continued reference to FIG. 2, program guide displays a selectable list of programming categories at step 72. The list of supported combination categories described above may be used by the program guide to determine which categories to display to the user. The displayed categories may include both simple categories and supported combination categories. The program guide may search the program listings database for program listings in each of the categories. The program guide may then display only those categories having at least one program listing associated with that category, while suppressing categories having no associated program listings. As shown in FIG. 4, category list 172 may be displayed as part of program guide display screen 170. Category list 172 is more useful to the user than category lists that contain only simple categories or those that contain potentially confusing nested hierarchical lists described above. Category list 172 is more detailed than non-hierarchical lists based on simple categories because it is not limited to broad categories. Category list 172 is also simpler to use than program guides that require users to enter multiple categories to initiate a search. Category list 172 retains the simplicity of use of non-hierarchical lists, because the user may intuitively scroll through the list (e.g., with arrow keys on remote control 42 or a suitable on-screen control). Moreover, category list 172 has the advantage of the hierarchical list in that it provides more useful and specific program categories for the user while avoiding the disadvantage of the hierarchical list's need to perform confusing searches by navigating through nested lists of categories. The user may initiate the display of list 172 using any suitable button or on-screen option provided by the program guide. The display off programming categories may be initially provided to the user by the program guide in alphabetical order. The program guide may display the name of the category 176, i.e., "sports-baseball," by including the simple categories that have been joined, i.e., "sports" and "baseball." Alternatively, the guide may display the name of one of the simple categories, e.g. "baseball," or another appropriate name for the category.

The order of the displayed categories may be modified to provide more useful information to the user. Commonly-assigned Rosenthol et al. U.S. patent application Ser. No. 09/262,658, filed Mar. 4, 1999 discloses several options for modifying the display of programming categories based on which categories are favorites of the user and is hereby incorporated by reference herein in its entirety. These and other examples of suitable ways in which the program guide may display programming categories in a manner which reflects user interest are described below.

Figure 5A:
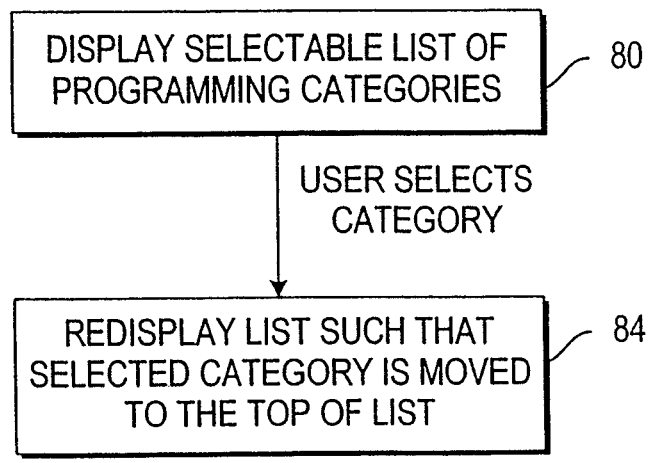
FIG. 5(a) is a flow chart of steps involved in providing options for selecting display configurations in accordance with the present invention.
Figure 5B:
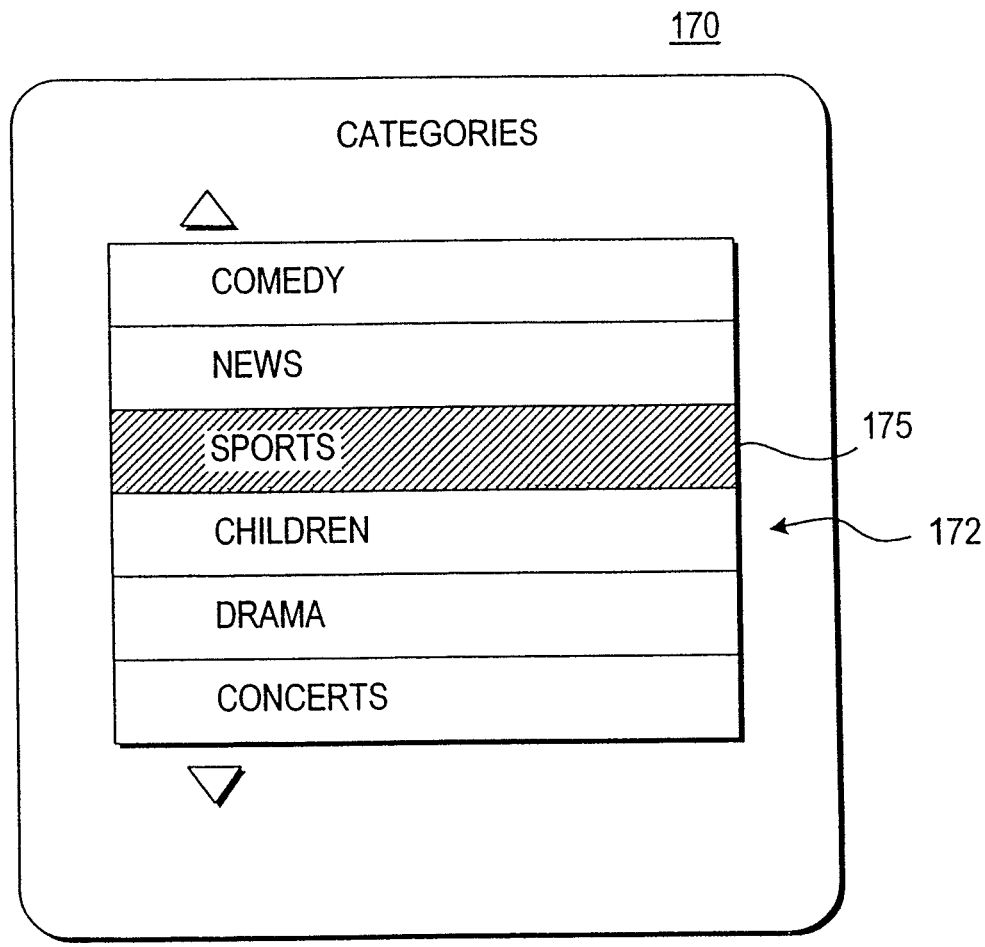
FIG. 5(b) is an illustrative interactive program guide display screen for displaying and selecting categories in accordance with the present invention.
Figure 5C:
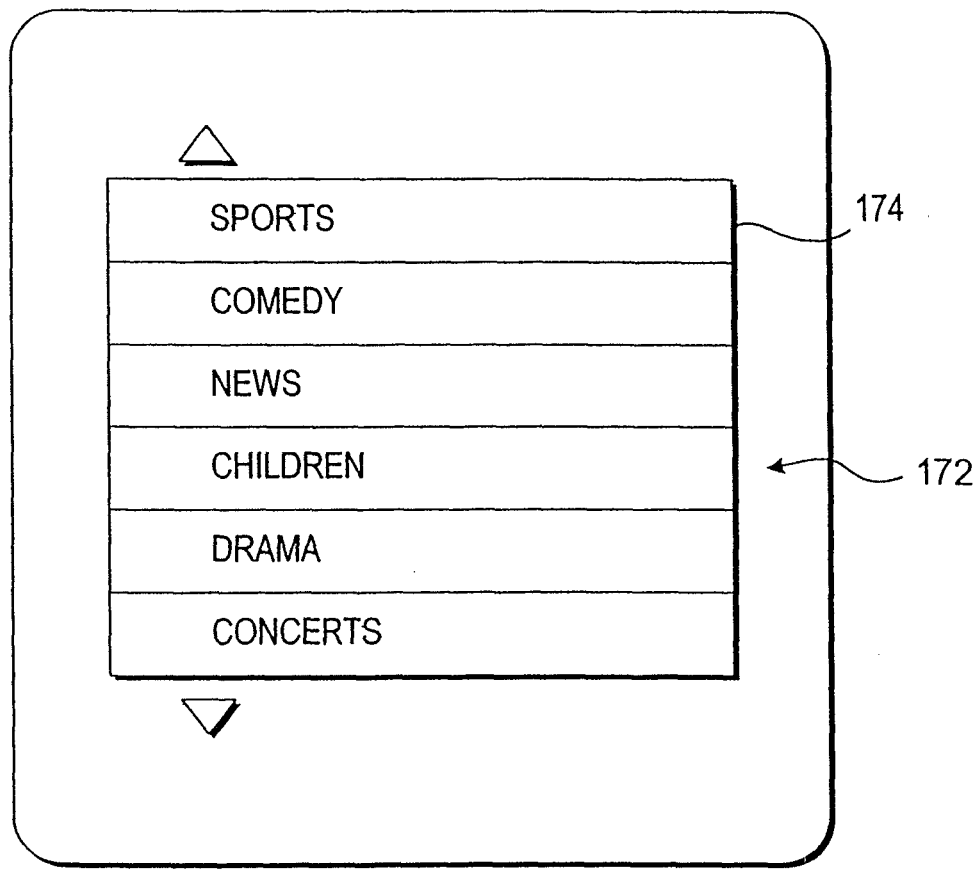
FIG. 5(c) is an illustrative interactive program guide display screen similar to FIG. 5(b), illustrating the redisplay of the categories after the selection of FIG. 5(b) in accordance with the present invention.

According to a first option, the program guide displays a selectable list of programming categories at step 80 (FIG. 5(*a*)). FIG. 5(*b*) displays category list 172 on display screen 170. After the user chooses a favorite programming category 174, e.g., sports, and presses enter on the user remote, the program guide redisplays the list of programming categories with the selected programming category moved to the top of the list of programming categories at step 84 (FIG. 5(*a*)). FIG. 5(*c*) displays favorite programming category 174 redisplayed at the top of category list 172.

Figure 6:
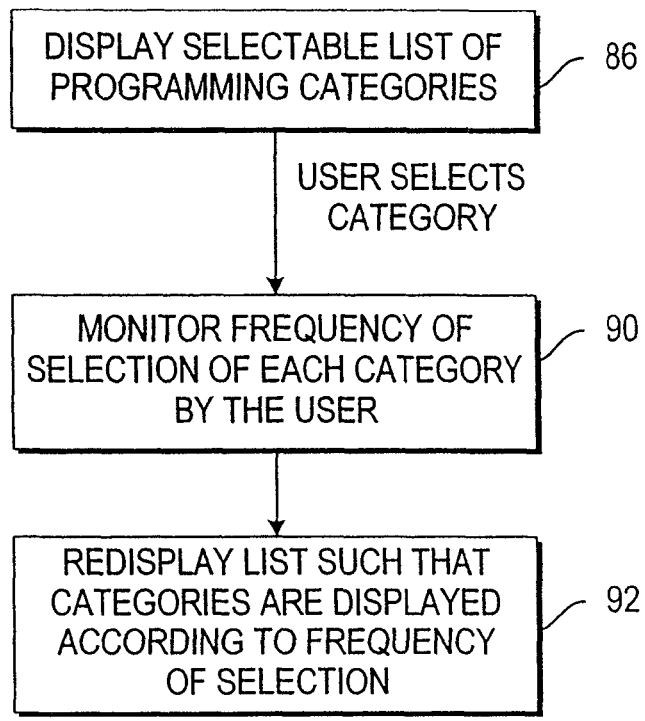
FIG. 6 is a flow chart of steps involved in providing options for selecting display configurations in accordance with an alternative embodiment of the present invention.

A second option is illustrated in FIG. 6. As with the first option, the selectable list of programming categories is displayed by the program guide at step 86. As the user selects various categories and views the associated program listings, the program guide monitors the frequency of selection of each of the programming categories at step 90. The program guide redisplays the list of categories according to the frequency of selection of each programming category at step 92. For example, the programming category selected most frequently may appear at the top of the list. The category having the second highest frequency of access may be displayed second on the list, and so forth.

Figure 7A:
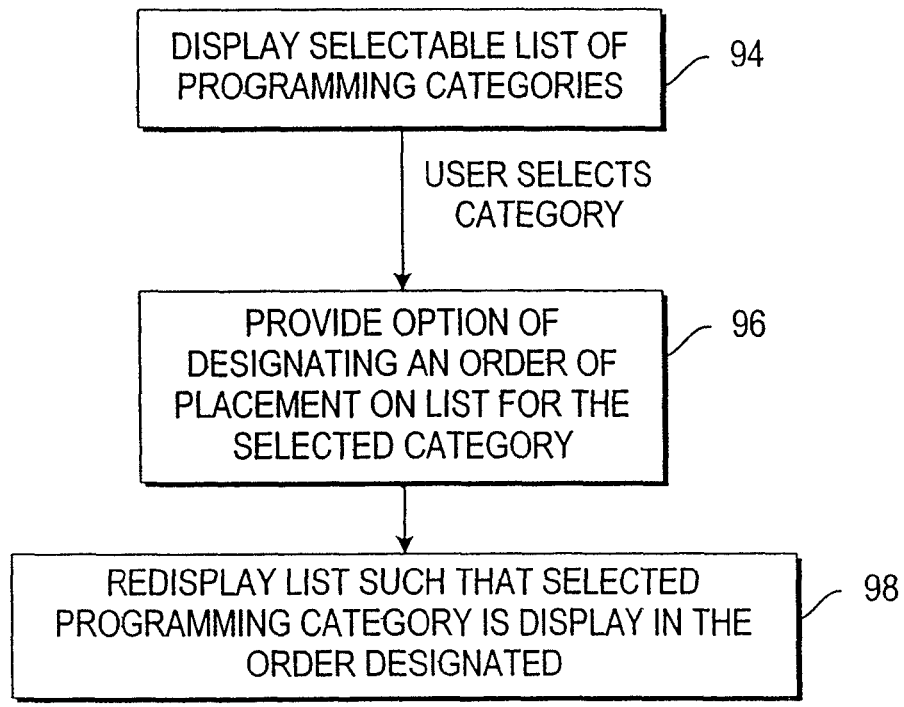
FIG. 7(a) is a flow chart of steps involved in providing options for selecting display configurations in accordance with a second alternative embodiment of the present invention.
Figure 7B:
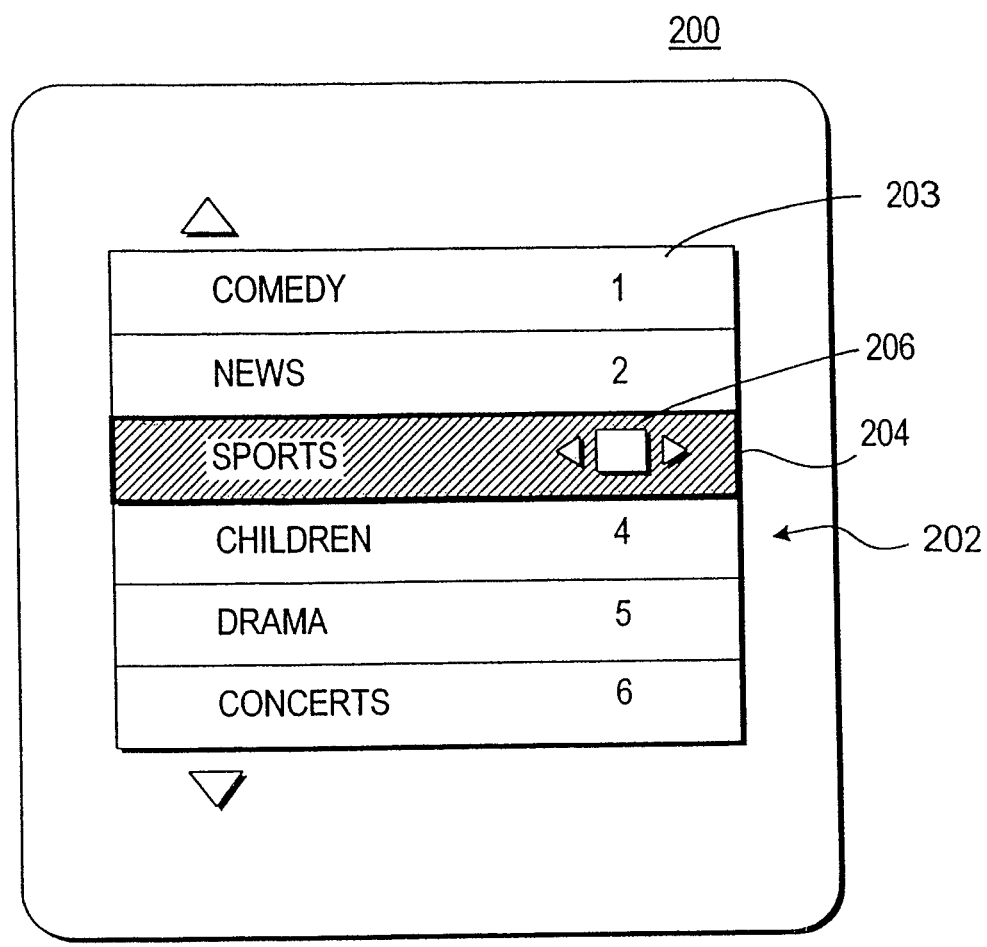
FIG. 7(b) is an illustrative interactive program guide display screen for displaying and selecting categories in accordance with the present invention.

A third option is illustrated in FIGS. 7(*a*) and 7(*b*). The program guide in FIG. 7(*a*) displays the selectable list of programming categories at step 94. After the user selects a category, the program guide provides the option of designating a particular location or order of placement in the category list 172 at step 96. The list is subsequently redisplayed by the program guide with the selected programming category appearing at the designated location at step 98. As illustrated in FIG. 7*b*), screen 200, similar to screen 170, above, displays category list 202 wherein each category has an initial ranking, such as ranking 203. The user stay wish to select the category 204, i.e., sports, and designate the second position in the list to be used for that category. Such designation may be made by entering the number "2" in box 206 by using numerical keys or the arrow keys on the user remote. The list is subsequently redisplayed by the program guide with the selected programming category appearing at the designated. Continuing with the example, the programming category sports will appear in the second position on the category list 202 (not shown).

Figure 8:
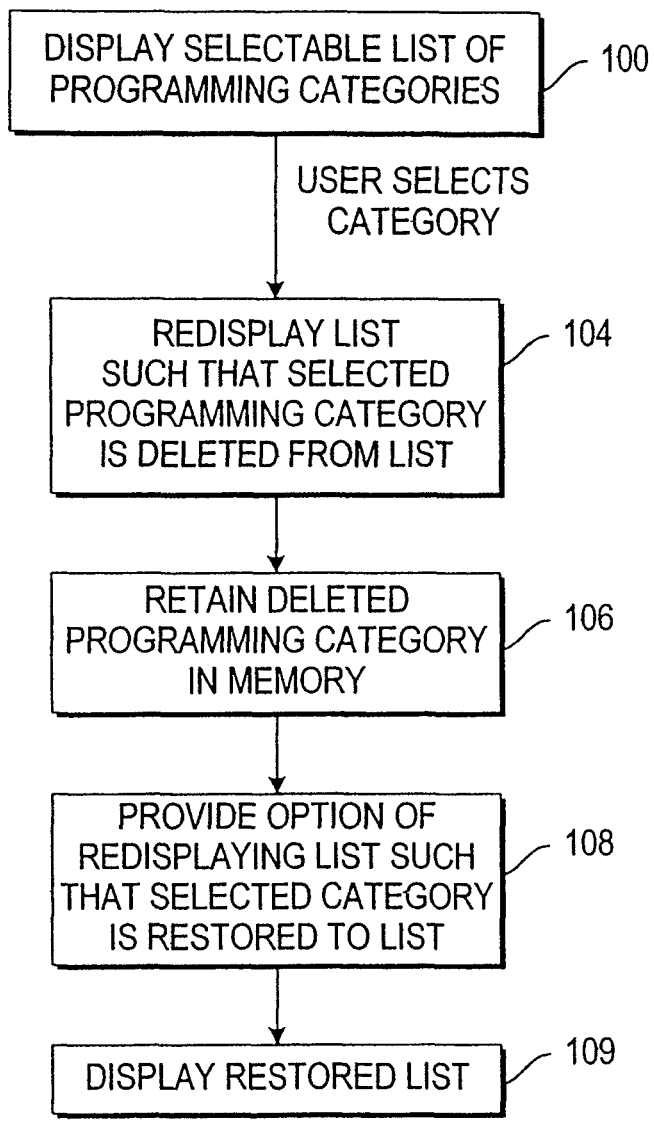
FIG. 8 is a flow chart of steps involved in providing options for selecting display configurations in accordance with a third alternative embodiment of the present invention.

According to a fourth option, tbe program guide displays a selectable list of programming categories at step 100 of FIG. 8. After the user selects a programming category, the program guide redisplays the list 172 of programming categories with the selected programming category deleted from the list 172 at step 104. The deleted category may foe permanently discarded or may toe retained by the program guide in step 106. At step 108, the program guide provides the user with the option of redisplaying the list such that the selected programming category is restored to the list. If the user opts to restore the deleted category to the list, the restored list may be displayed at step 109. The option to retain and restore or delete categories is particularly useful if the user's interests change or if multiple users share the program guide. A programming category that may have been of little interest to the user at one time may subsequently attract greater interest for the user or may be of interest to another one of the users.

As shown in FIG. 2, after the program guide displays the selectable list of categories at step 72, the user may select a desired category. As shown in FIG. 4, the program guide may allow the user to use arrow keys on remote control 42 (FIG. 1) to position a highlight region such as highlight region 174 on a particular programming category 176, e.g., "sports-dramas". After the desired category has been highlighted, the user may press enter on remote control 42. This directs the program guide to use the selected category (e.g., the category "sports-dramas") as a search criterion for searching the program listings data for programming having the "sports-dramas" combination category. As illustrated in FIG. 2, the program guide searches for program listings data matching the selected category at step 76. The search may foe performed in database 36 or 45 by the user equipment 26 or 28, or alternatively, in database 24 at television distribution facility 20 when a client-server architecture is used (FIG. 1). If an on-line program guide configuration is used, the search may be performed by the web server that provides the on-line program listings.

At step 78, the program guide displays the results of the search, i.e., the program listings that match the selected category.

Figure 9:
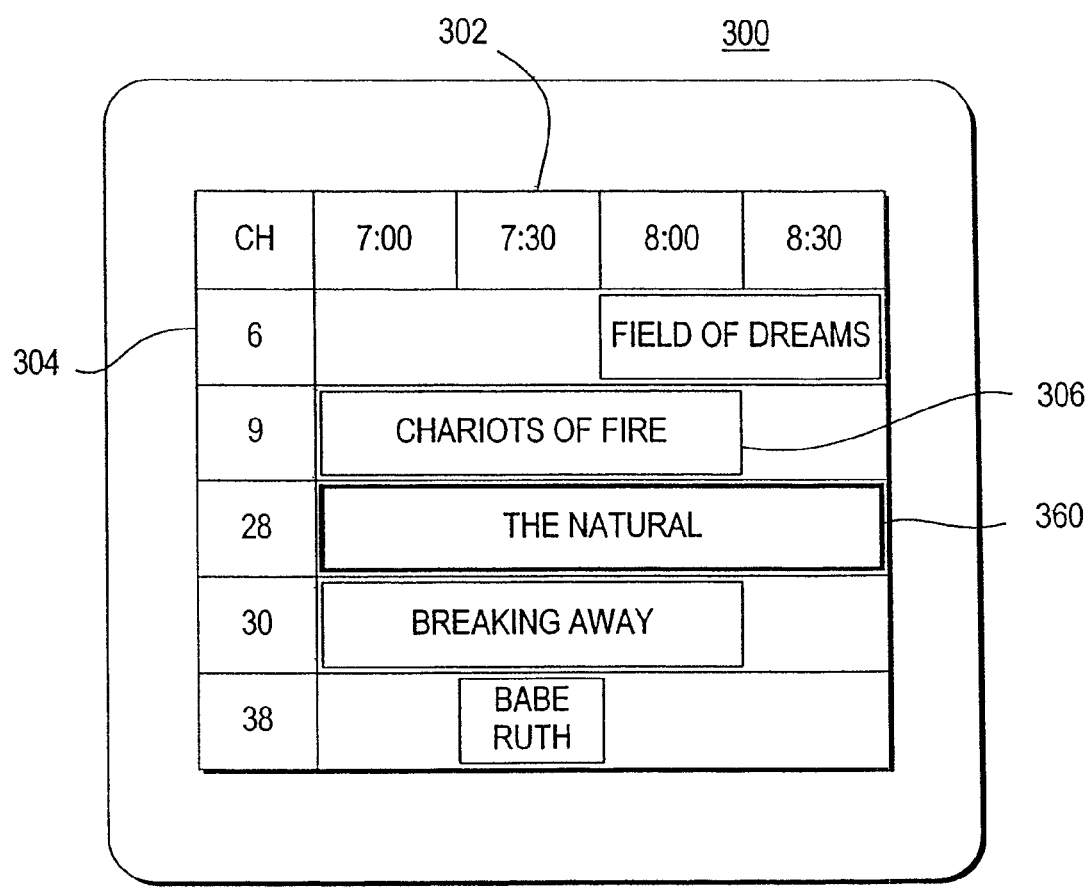
FIG. 9 is an illustrative program display screen containing program listings that match a selected category in accordance with the present invention.

Program listings that match the selected category "sports-drama" are displayed (as an example) in FIG. 9. The program listings displayed in screen 300 of FIG. 9 are organized by broadcast time 302 and by channel 304. Cells 306 for program listings that satisfy the search by matching the selected category are displayed, whereas programs which do not satisfy the search are suppressed from view. Channels which have no matching programs may be suppressed from the display. For example, channels 7 and 8 would not be displayed in display screen 300 if they are not broadcasting programming in the "sports-drama" category.

Figure 10:
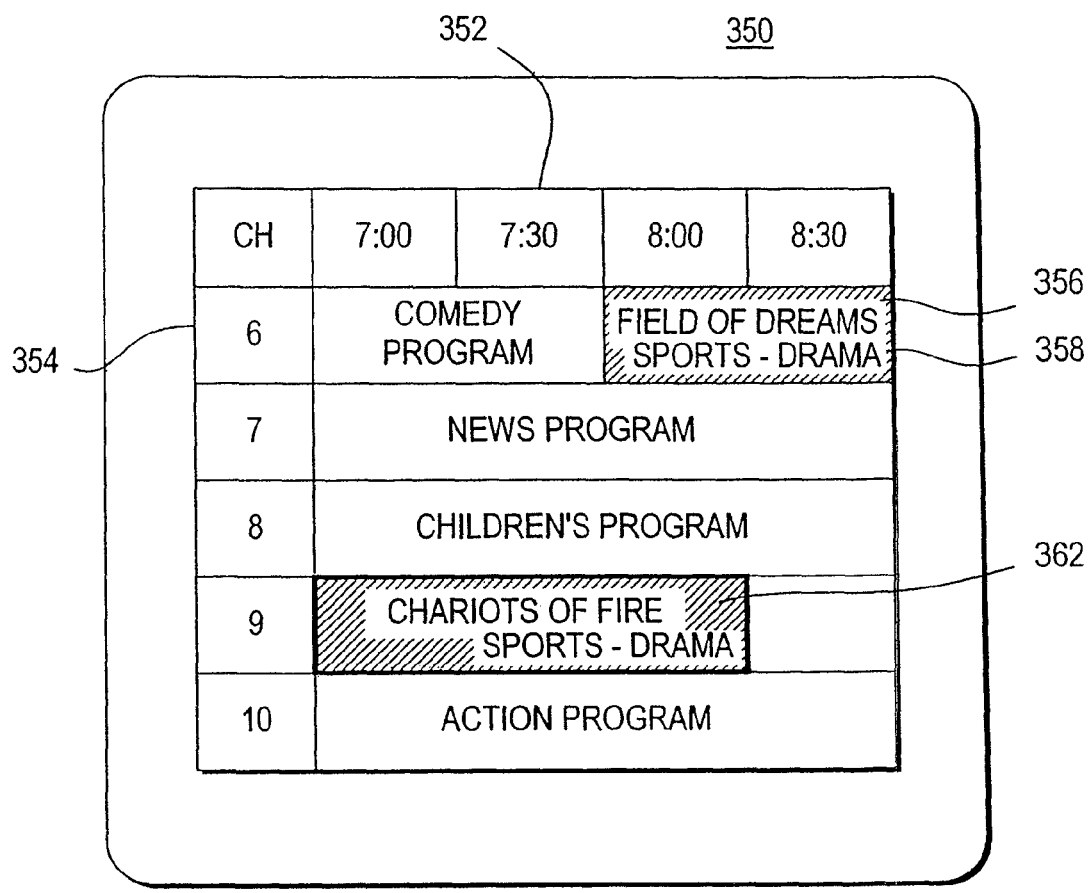
FIG. 10 is an illustrative program guide display screen in which the program listings that match a selected category have been distinctively displayed in accordance with the present invention.

In the example of FIG. 9, only programming that has the category "sports-drama" is displayed. Another approach is shown in FIG. 10. With the approach of FIG. 10, screen 350 is used to display all available program listings to the user organized by broadcast time 352 and by channel 354. Cells 356 containing program listings that satisfy the search may be distinctively displayed to attract the user's attention. For example, each program listing satisfying the search may be represented in a distinctive color. In addition (or alternatively), an icon or label 358, e.g., "sports-drama" may be provided in the program listing cell 356 to indicate a match of that listing with the selected programming category. Thus, all programming is displayed, but only programming having the "sports-drama" category is distinctively displayed.

Figure 11:
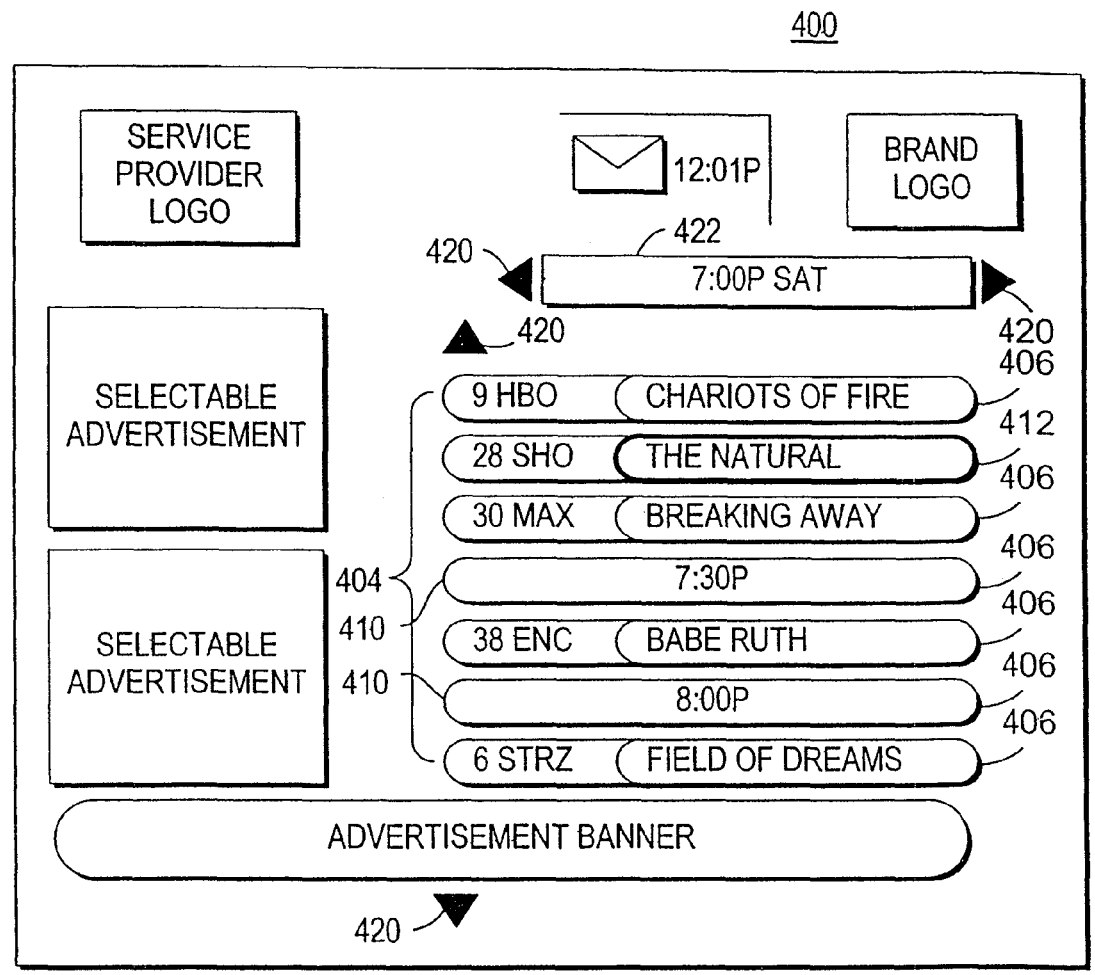
FIG. 11 shows an illustrative program listings by category screen in accordance with the invention.

A further example of a program listings by category screen is shown in FIG. 11. The illustrative screen 400 of FIG. 11 includes program listings that match the category sports-drama. It is understood that screen 400 may be used to display program listings for any suitable category. The program listings by category screen of FIG. 11 shows an alternative way in which program listings may be displayed and navigated through for any display screen in which listings are displayed for multiple time slots. Program listings within list 404 may be displayed in cells 406, and divided into predefined time slots, such as into 30 minute time slots. Users may quickly change between time slots by, for example, pressing a "right" or "left" arrows on remote control 42. Between each time slot, separator 410 may be displayed to indicate to a user that a user has scrolled or paged program listings from one time slot to the next. In FIG. 11, for example, a user is scrolling from program listings for sports-drama in the 7:00 PM time slot to program listings for sports-drama in the 7:30 PM time slot. When the user scrolls within listings, highlight region 412 may skip separator 410. If desired, separators 410 may be displayed only for those time slots for which there are listings. For example, if there were no sports-drama programs starting at 7:30 PM, that separator would not be displayed. If desired, there may be a "watch previews" selectable feature that users may select to view a preview for a highlighted listing. Users may also view additional information for a listing by, for example, highlighting the listing and pressing an "info" key on remote control 42.

In the program listings screens of FIG. 11, program listings may be displayed within each time slot sorted in any suitable manner. Listings may be displayed, for example, by title, channel, start time, or using any other suitable approach. The program listings screen of FIG. 11 has also been shown as including various other screen elements. Program listings display screens may include, for example, selectable advertisements, advertisement banners, brand logos, service provider logos, clocks, message indicators, arrow indicators 420, or any other suitable screen element. (It is understood that such elements may also be displayed on screens illustrated in FIGS. 9-10, above.) In the illustrative program listings screen of FIG. 11, the program guide may also adjust the time displayed in timebar 422 as the user scrolls or pages through program listings to reflect the time of the program listing at the top of the list.

Regardless of the techniques used to display the search results, the program guide preferably allows the user to navigate through the program listings and select a desired listing (e.g., by positioning a highlight region such as highlight region 360 (FIG. 9), 362 (FIG. 10), or 412 (FIG. 11)). When the user selects a given program listing from the search results, the program guide may take various actions, depending on the type of program listing that was selected. For example, if a program for the selected listing is currently being broadcast, the program guide may provide the user with an option to tune to that program. If the program for the selected listing is scheduled to be broadcast in the future, the program guide may ask if the user wishes to set a reminder for the program. The program guide may also provide the user with an opportunity to direct the guide to record the program or to purchase the program if the program is a pay-per-view event. These various post-search-result features are well known. If desired, the user may simply scroll through the program listings to review which programs are available. Further examples of searching and displaying programming categories are described in U.S. application Ser. No. 09/262,658, incorporated by reference above.

Figure 12:
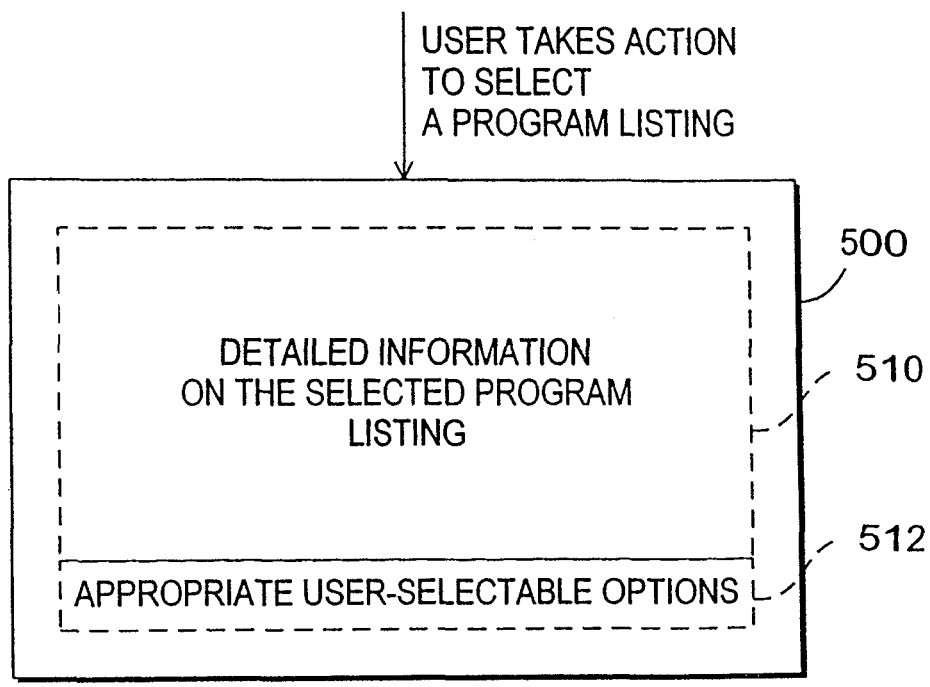
FIG. 12 shows an illustrative interactive program guide display screen for providing information and user-selectable options with respect to program listings, in accordance with the invention.

When a user selects a listing, such as 360/362/412 described above, the program guide may display an interactive information display screen such as interactive information display screen 500 of FIG. 12 (which is substantially identical to a portion of FIG. 4a of David M. Rudnick et al. U.S. patent application Ser. No. 09/356,268, entitled PROGRAM GUIDE WITH INTERACTIVE INFORMATION DISPLAY SCREEN, filed Jul. 16, 1999, and incorporated by reference in its entirety herein). Interactive information display screen 500 may include detailed information portion 510 and may include a set of user-selectable options 512.

The content of interactive information display screen 500 may depend on the type of program selected. For example, detailed information portion 510 may include several lines of text providing information appropriate for display for a program which may include, for example, a list of all simple categories and combination categories associated with the program, etc. User-selectable options 512, for example, in a menu, may include options that may depend on which type of program is selected and the information associated with the selected item.

The foregoing is merely illustrative of the principles of this invention and various modifications can be made by those skilled in the art without departing from the scope and spirit of the invention.

What is claimed is:

1. A method for providing media asset information using media asset categories, the method comprising:
   storing, with processing circuitry, a plurality of simple categories;
   determining a frequency of use for each of a plurality of combination categories of at least two simple categories from the plurality of simple categories;
   identifying, based on the determined frequency of use, a first combination category of the plurality of combination categories that is determined to have a frequency of use that is higher than a second combination category of the plurality of combination categories and;
generating a display of the identified first combination category based on the determined frequency of use of the identified first combination category.

2. The method of claim 1, further comprising:
generating for display at least one simple category selected from the plurality of simple categories.

3. The method of claim 1, wherein the generated display of the first combination category further comprises at least one simple category selected from the plurality of simple categories.

4. The method of claim 1, further comprising:
identifying a media asset that matches the first combination category; and
generating a display comprising information about the identified media asset.

5. The method of claim 1, further comprising:
identifying a plurality of media assets wherein each media asset of the plurality of media assets matches the first combination category; and
generating a display comprising information about each of the identified plurality of media assets.

6. The method of claim 1, further comprising:
identifying a media asset that matches the first combination category but does not match any of the other combination categories; and
generating a display comprising information about the identified media asset.

7. The method of claim 6, further comprising:
receiving a user indication to deactivate a second combination category, wherein the second combination category is associated with at least two simple categories from the plurality of simple categories; and
removing the second combination category from the plurality of combination categories in response to the user indication.

8. The method of claim 6, further comprising:
receiving a user indication to restore a second combination category, wherein the second combination category is associated with at least two simple categories from the plurality of simple categories; and
add the second combination category to the plurality of combination categories in response to the user indication.

9. The method of claim 1, wherein the first combination category is generated for display using an intervening character to join the two or more simple categories of the first combination category.

10. A system for providing media asset information using media asset categories, the system comprising:
storage circuitry configured to store a plurality of simple categories; and
control circuitry configured to:
determine a frequency of use for each of a plurality of combination categories of at least two simple categories from the plurality of simple categories;
identify, based on the determined frequency of use, a first combination category of the plurality of combination categories that is determined to have a frequency of use that is higher than a second combination category of the plurality of combination categories; and
generate a display of the identified first combination category based on the determined frequency of use of the identified first combination category.

11. The system of claim 10, wherein the control circuitry is further configured to:
generate for display at least one simple category selected from the plurality of simple categories.

12. The system of claim 10, wherein the generated display of the first combination category further comprises at least one simple category selected from the plurality of simple categories.

13. The system of claim 10, wherein the control circuitry is further configured to:
identify a media asset that matches the first combination category; and
generate a display comprising information about the identified media asset.

14. The system of claim 10, wherein the control circuitry is further configured to:
identify a plurality of media assets wherein each media asset of the plurality of media assets matches the first combination category; and
generate a display comprising information about each of the identified plurality of media assets.

15. The system of claim 10, wherein the control circuitry is further configured to:
identify a media asset that matches the first combination category but does not match any of the other combination categories; and
generate a display comprising information about the identified media asset.

16. The system of claim 15, wherein the control circuitry is further configured to:
receive a user indication to deactivate a second combination category, wherein the second combination category is associated with at least two simple categories from the plurality of simple categories; and
remove the second combination category from the plurality of combination categories in response to the user indication.

17. The system of claim 15, wherein the control circuitry is further configured to:
receive a user indication to restore a second combination category, wherein the second combination category is associated with at least two simple categories from the plurality of simple categories; and
add the second combination category to the plurality of combination categories in response to the user indication.

18. The system of claim 10, wherein the control circuitry is configured to generate for display the first combination category using an intervening character to join the two or more simple categories of the first combination category.

19. A method for providing media asset information using media asset categories, the method comprising:
storing, in a storage device, a plurality of combination categories, each of the combination categories being associated with at least two simple categories of a plurality of simple categories;
storing a value indicating frequency of selection for each of the plurality of combination categories;
receiving, from an input device with processing circuitry, user selections of a subset of the plurality of combination categories;
for each of the received user selections:
retrieving the value indicating frequency of selection associated with the combination category in the subset of the plurality of combination categories that is selected by the user;

adjusting the retrieved value indicating frequency of selection; and storing the adjusted retrieved value associated with the combination category in the subset of the plurality of combination categories that is selected by the user;

retrieving the value indicating frequency of selection for each of the plurality of combination categories;

comparing a first value indicating frequency of selection associated with a first of the plurality of combination categories with a second value indicating frequency of selection associated with a second of the plurality of combination categories;

determining that the first value indicating frequency of selection associated with the first combination category is greater than the second value indicating frequency of selection associated with the second combination category; and generating a display of the first combination category based on determining that the first value is greater than the second value.

20. A system for providing media asset information using media asset categories, the system comprising:

a storage device configured to:

store a plurality of combination categories, each of the combination categories being associated with at least two simple categories of a plurality of simple categories;

store a value indicating frequency of selection for each of the plurality of combination categories;

processing circuitry configured to:

receive, from an input device, user selections of a subset of the plurality of combination categories;

for each of the received user selections:

retrieve, from the storage device, the value indicating frequency of selection associated with the combination category in the subset of the plurality of combination categories that is selected by the user;

adjust the retrieved value indicating frequency of selection; and store, in the storage device, the adjusted retrieved value associated with the combination category in the subset of the plurality of combination categories that is selected by the user;

retrieve, from the storage device, the value indicating frequency of selection for each of the plurality of combination categories;

compare a first value indicating frequency of selection associated with a first of the plurality of combination categories with a second value indicating frequency of selection associated with a second of the plurality of combination categories;

determine that the first value indicating frequency of selection associated with the first combination category is greater than the second value indicating frequency of selection associated with the second combination category; and generate a display of the first combination category based on determining that the first value is greater than the second value.

* * * * *